United States Patent [19]
Bisconte

[11] Patent Number: 5,604,351
[45] Date of Patent: Feb. 18, 1997

[54] PROCESS AND APPARATUS FOR AUTOMATIC ANALYSIS OF ELEMENTS IN WEAK CONCENTRATION ON A SUPPORT

[75] Inventor: Jean-Claude Bisconte, Briis Sous Forges, France

[73] Assignee: Biocom S.A., Les Ulis, France

[21] Appl. No.: 384,574

[22] Filed: Feb. 6, 1995

[30] Foreign Application Priority Data

Feb. 4, 1994 [FR] France .................... 94 01263

[51] Int. Cl.⁶ .................................. G01N 21/64
[52] U.S. Cl. ........................ 250/458.1; 250/201.7
[58] Field of Search ............... 250/458.1, 459.1, 250/201.4, 201.7

[56] References Cited

U.S. PATENT DOCUMENTS

| | | | |
|---|---|---|---|
| 4,963,724 | 10/1990 | Newmann | 250/201.7 |
| 5,239,171 | 8/1993 | Takabayashi et al. | 356/73 |
| 5,381,224 | 1/1995 | Dixon et al. | 250/458.1 |

FOREIGN PATENT DOCUMENTS

| | | |
|---|---|---|
| 59-232306 | 12/1984 | Japan. |
| 60-026311 | 2/1985 | Japan. |
| 3-168712 | 7/1991 | Japan. |

Primary Examiner—Michael J. Tokar
Assistant Examiner—Richard Hanig
Attorney, Agent, or Firm—Weiser & Associates, P.C.

[57] ABSTRACT

The present invention relates to a process of automatic analysis of elements in weak concentration on a support of objects of low occurrence, having a high-contrast surface state, consisting of illuminating the observation zone with a first light source (5) emitting in a first wavelength range, and a second source (4) emitting in the excitation spectrum of the objects (23, 32) of low occurrence, proceeding to focus image acquisition means and after focusing triggering the accumulation of photons emitted by the objects (23, 32) of low occurrence illuminated with a source (4) emitting in the excitation spectrum of said objects (23, 32), characterized in that one proceeds to modify the focusing of the image aquisition means until maximization of the contrast of a zone (30) in said first wavelength range, said zone (30) being dissociatable from the observation zone illuminated from the second light source.

10 Claims, 2 Drawing Sheets

PROCESS AND APPARATUS FOR AUTOMATIC ANALYSIS OF ELEMENTS IN WEAK CONCENTRATION ON A SUPPORT

The present invention relates to a process of automatic analysis of microscopic elements in weak concentration on a support.

Such processes are used in particular to measure the characteristics of cells and bacteria deposited by filtration and fixed on a membrane, and for the analysis of subelements of cells, such as the nuclei or chromosomes.

The objects observed are small in size, generally between 0.5 and 50 µm, and require major enlargement. The occurrence of the objects to be analyzed on the support is also weak, which makes it virtually indispensible for the sake of routine controls to automate the analysis.

These microscopic processes, known by the name of cytometry, implement a first light source in the visible spectrum and a second source that emits in the excitation spectrum of marking products fixed by the objects in weak concentration to be detected and/or analyzed.

French Patent FR 2638240 of present applicant describes a fixation stage for supports that carry specimens, which is especially well adapted to such analyses.

The object of the invention described in that patent is in particular to improve focusing of the image acquisition system, that is, a charge-coupled device camera or a photomultiplier. It has made it possible to obtain perfect planarity of the support to be analyzed, to facilitate rapid fixation, and to automatically index one or more specimens, and to make an automatic search with the greatest ease possible.

However, automated focusing, in the present state of the art, employs complex algorithms and does not allow completely dispensing with manual intervention by an operator who verifies the focusing. Moreover, the processes in the prior art are perturbed by empty zones in which there is no object to be observed.

Another disadvantage of the apparatus and processes of the prior is that they require a very long adaptation period, when the objects to be observed have a low degree of luminescence, such as when the objects have a fluorescent marker that requires the use of a photon accumulation camera. These apparatus are accordingly incompatible with automatic the focusing.

In the prior art, various attempts have been made to improve the focusing automation processes. In a Japanese reference JP 60 026 311, it has been proposed that an image of the entire stage be used, obtained by infrared illumination. Another Japanese document, Patent JP 31 68712, discloses a process consisting of detecting the interference fringes formed on the surface of the object, which requires complex processing of the image and a high resolution on the part of the focusing automation system.

The object of the present invention is to overcome these disadvantages by proposing a process and an apparatus that enable automating the focusing, even when the light level is quite low, or when no object is present in the field of observation. Another object of the invention is to propose a process and an installation for automating focusing at a reduced price and with high reliability.

To that end, the invention consists of using a support that has a high-contrast surface condition, illuminating a marginal zone of the field of observation with a first light source emitting in the visible spectrum, and modifying the focusing of the image acquisition means by maximizing the contrast of said marginal zone illuminated by the visible light.

The support is for example constituted of a microporous membrane in disk form or integrated in a flexible support. The image aquisition system records two images, that is, the focusing image originating in a zone illuminated by the source of visible light, and the image of the objects sought, originating in the complementary zone of very low luminosity, the emission of photons originating principally from the excitation of the fluorescent markers. Image analysis enables determining the contrast of the first image, by calculating the difference between the level wherein the pixels or elementary points of the image whose luminosity is the slightest, on the one hand, and the level of the pixels whose luminosity is the greatest, on the other.

Focusing is done by adjustment of focusing until the position corresponds to the maximizing of contrast in the image observed.

The dissociation of the two images can be accomplished in various ways:

by optical means, by forming two zones separated in space, for instance a zone of small size for focusing and a zone corresponding to the essential portion of the field of the optical block, for observation of the objects, as applicable by accumulation of photons;

by electronic means, by temporally separating the images by activating the first light source and the second light source alternatingly. This temporal separation may be accomplished by electrical or mechanical means. It is also conceivable to make the second light source permanently active when the luminance level by epifluorescence is slight relative to the level of illumination by transmission;

by chromatic means, by using a chromatic camera, for example a set of three CCD cameras equipped with passband filters.

In a first variant, a marginal zone, advantageously between 3 and 8% of the surface area of the field of observation, is illuminated with the first light source in the visible spectrum, and the focusing is determined as a function of the maximization of the difference between the value of the pixel of slightest luminosity and the value of the pixel of the greatest luminosity.

In a second variant the support of the object is illuminated alternatingly with the first light source emitting in the visible spectrum and with the second light source, and focusing is done synchronously with the operation of the first light source by modification of the focusing of the image acquisition means until the contrast in a zone illuminated by the visible light is maximized.

Advantageously, the extinction of the first light source is ordered when the image contrast is maximal.

In a third variant, the support is illuminated with a first light source in the visible spectrum, emitting in a first wavelength range different from the second wavelength range of fluorescence of the objects observed, the image acquisition means including means for separating the two wavelength ranges, the process consisting of proceeding to modify the focusing of the image acquisition means until maximization of the contrast of the image corresponding to the first wavelength range.

The invention also relates to an apparatus for microscopic analysis of elements in weak concentration on an object support having a high-contrast surface state, a stage on which the support carrying the objects to be analyzed is disposed, a first illumination element constituted by a source of light in the visible .spectrum and by collimating means formed by a condenser and a diaphragm, a second illumination element and an image acquisition means furnishing an electrical signal to a circuit for signal processing and visualization of the images observed. The analysis apparatus according to the invention is distinguished in that it includes means to cause the zone illuminated by the first illumination element to coincide with a marginal zone of the observation field, and that the signal processing circuit furnishes a slaving signal of the focusing as a function of the contrast of the image in said zone illuminated by the first illumination means.

Advantageously, the apparatus according to the invention includes means to cause the zone illuminated by the first illumination element to coincide with a marginal zone of the observation field, and hence of the CCD pickup, in order to offset the zone illuminated by visible in a marginal portion of the observation field.

Preferably, the source of visible light is off-centered relative to the observation zone of image acquisition means.

In a variant, the apparatus includes means for alternatingly activating the first light source and the second light source, and the processing circuit furnishes a synchronizing signal for the activation of the focusing when the first light source is active.

In another variant, the apparatus includes an image acquisition means that furnishes chromatic signals, the first light source emitting in a wavelength range distinct from the fluorescence length of the objects observed, the processing circuit generating a first signal corresponding to the image in the wavelength range of the first light source, said signal constituting the slaving signal of the focusing as a function of the contrast of first said image in said zone illuminated by the first illumination means, and a second signal corresponding to the image of the objects observed.

The invention will be better understood from reading the description, referring to the accompanying drawings, in which:

FIG. 1 shows one exemplary embodiment of an apparatus according to the invention. It is constituted by a stand (1) supporting a specimen holding stage (2), an optical block (3), a source of light (4) for epiillumination of the specimen, and a source of visible light for illumination by transmission (5).

Figure 1:
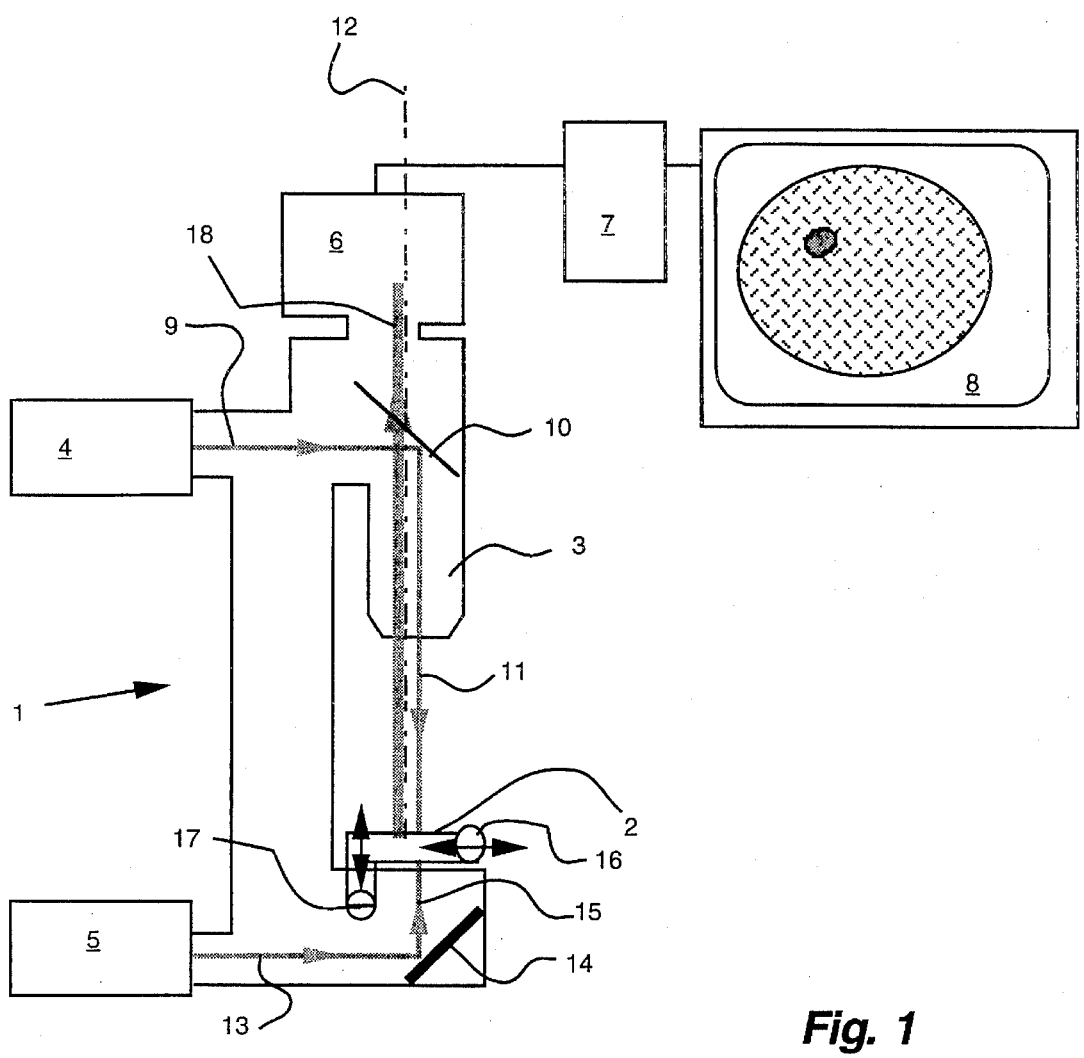
FIG. 1 is a schematic illustration of an apparatus according to the invention.

The optical block (6) includes a charge coupled device or CCD camera, which furnishes an electrical signal to a processing circuit (7), one output of which is connected to a visualization monitor (8).

The first light source (4) emits a beam (9) in the excitation spectrum of fluorescent markers. The beam (9) is reflected by a semi-transparent mirror (10) to form an excitation beam (11) aimed along the optical axis (12) of the optical block (3).

This epifluorescencent beam (11) forms a first illuminated zone, centered on the optical axis (12) of the optical block (3).

The second light source (5) emits a beam (13) in the visible spectrum. This beam (13), in the exemplary embodiment described, is deflected by a mirror (14) so as to be aimed parallel to the optical axis (12). It illuminates the specimen from below, to form a second illuminated zone offset relative to the zone illuminated by epifluorescence.

The specimen is carried by a support fixed on a stage that is movable by translation in the horizontal plane by way of a motorized control (16), and in the vertical plane by way of a micrometric motorized control (17). The height control (7) enables positioning the specimen in the focusing plane of the optical block (3).

The image beam (18) received by the camera corresponds to the image of a first dark zone (31) having bright points (32), this first zone originating in the fluorescence of the marked objects, and a second, light zone with dark points (30), this second zone corresponding to the image of the membrane of the object support illuminated by transmission.

Figure 2:
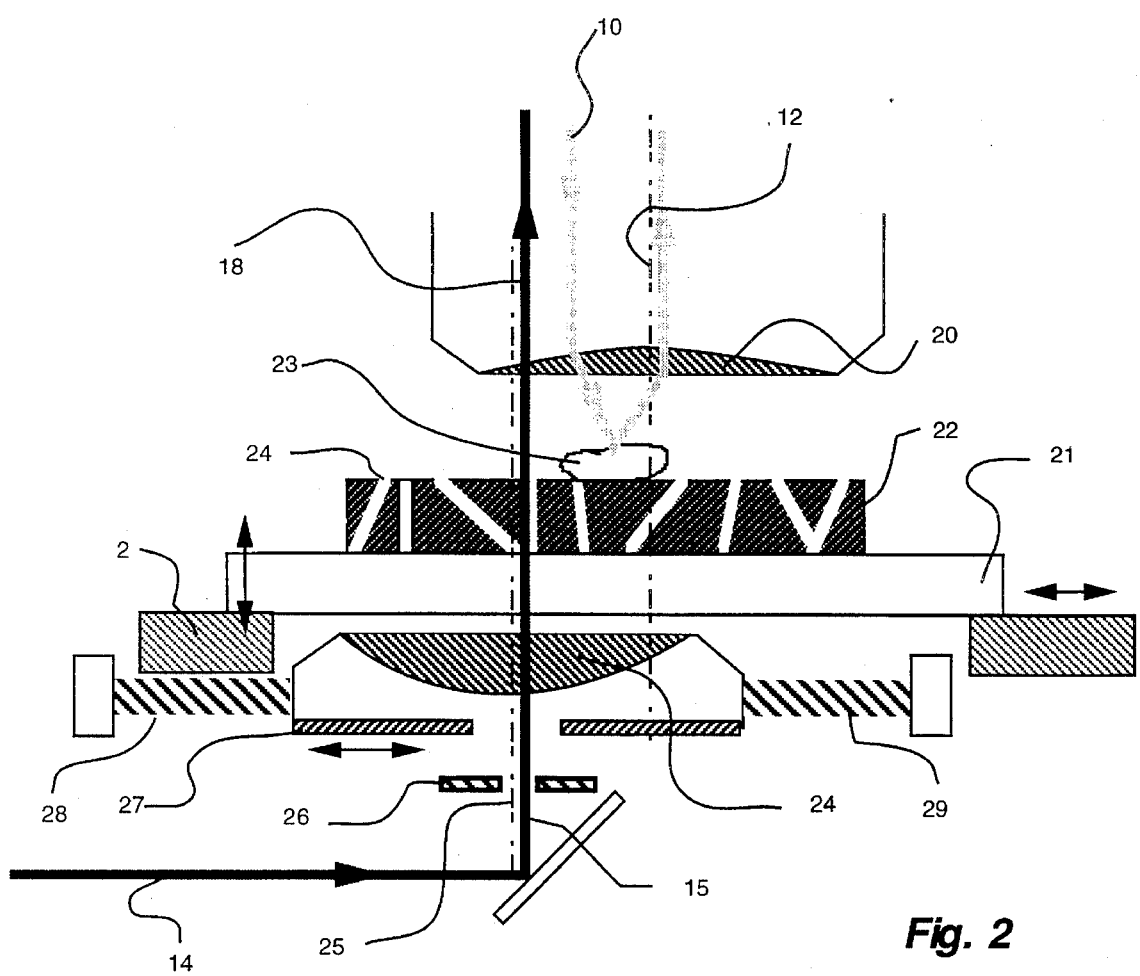
FIG. 2 shows a detailed view of the optical portion of the apparatus according to the invention.

FIG. 2 shows a detailed view of the optics of the apparatus. The objective includes a collimating lens (20), in a known manner. The object-carrying stage supports a transparent sheet of glass (21) on which the porous membrane (22) of slight thickness (5 to 10 µm) is placed, on which the marked objects (23) to be identified and/or analyzed are fixed.

The membrane (22) is made of any known material, for example polyester, having pores with a mean cross section of 0.8 µm, or a porous membrane with a mean thickness of eight microns. Such membranes as a result have a high-contrast surface state, that is, a surface state having luminosity levels that can be differentiated in an arbitrary elementary portion that can be likened to a plane.

The illumination by transmission is done by means of an assembly embodied by a condenser (24) and a diaphragm (26), whose optical axis (25) is offset relative to the main optical axis (12) of the optical block (3).

The height of the condenser (24) relative to the membrane (22) is adjusted in such a way as to form a clear image of the diaphragm (26) in the observation field.

A second diaphragm (27) serves to limit the contours of the zone illuminated by transmission.

Off-centering means (28, 29) enable adjustment of the position of the zone illuminated by transmission relative to the observation zone.

Figure 3:
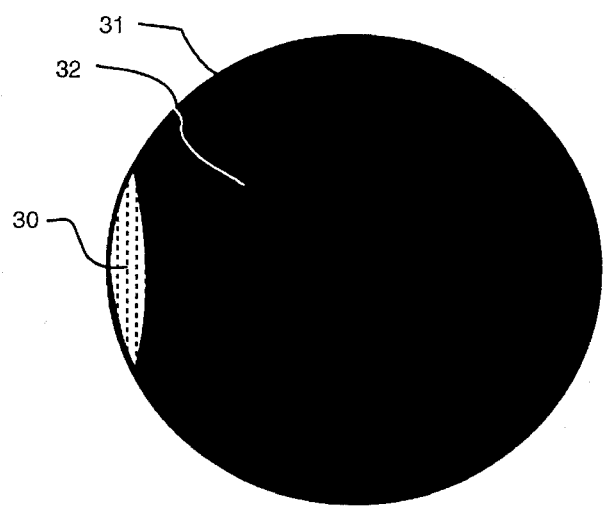
FIG. 3 is a schematic view of the observation field.

FIG. 3 shows one example of an observation zone.

A first zone (30) can be distinguished, representing approximately 5% of the surface area of the observation zone. This first zone (30) is light and has dark points, corresponding to the pores of the portion of the membrane (22) illuminated by transmission.

A second zone (31) essentially covering the observation zone, corresponds to the zone illuminated by epifluorescence. It is essentially black, except for some bright points (32) corresponding to the products marked.

To automate the focusing, one proceeds as follows:

For a given height of the stage (2) relative to the optical block (3), the contrast of the light zone (30) is calculated by determining the difference between the value of the lightest pixels and the value of the darkest pixels, by information processing of the electrical signal furnished by the camera (6). The value of this difference is memorized and constitutes a variable $\Delta_1$.

Next, the height of the stage (2) is incremented relative to the optical block, and a reevaluation of the contrast of the light zone (30) is made in order to determine a new variable $\Delta_2$.

If this variable $\Delta_2$ is greater than $\Delta_1$, then the height of the stage is re-incremented, and the value $\Delta_y$ is recalculated, until this variable decreases. The focusing in the plane of the surface of the membrane corresponds to the height preceding that for which the variable $\Delta$ had begun to decrease.

If the value $\Delta_2$ is less than $\Delta_1$, then the height is decremented until the variable $\Delta$ begins to increase. It is understood that one skilled in the art can determine complementary algorithms in order to smooth out any possible faults in illumination or image acquisition.

The focusing may be done automatically in real time and may make it possible to explore a specimen continuously, with the focusing being done after each displacement of the stage (2).

In particular, when the material has a proper surface area, and in particular a homogeneous distribution of irregularities and a stable contrast level, it is possible to monitor the focusing continuously. Modifying the adjustment of the height of the optical block is done in this case only when the contrast value varies.

The accumulation of photons is triggered as soon as the procedure of focusing has been completed. By way of example, the table below shows the variation in the values of the lightest and darkest pixels, as a function of the height of the stage varying by increments of 1 µm. This table in particular shows that there is a single maximum contrast value that corresponds exactly to the focusing plane.

| Focus | Value of the darkest pixels | Value of the lightest pixels | Contrast Δ |
| --- | --- | --- | --- |
| +3 | 60 | 108 | 48 |
| +2 | 60 | 110 | 50 |
| +1 | 60 | 115 | 55 |
| 0 | 55 | 120 | 65 |
| −1 | 60 | 116 | 56 |
| −2 | 60 | 115 | 55 |
| −3 | 60 | 111 | 52 |

The invention is described in the above way of nonlimiting example. It is understood that one skilled in the art can accomplish different variants without departing from the spirit and scope of the invention. In particular, he may employ other optical or electronic means than those described by way of example in order to dissociate the focusing zone and the observation zone.

I claim:

1. A process for automatic analysis of elements in weak concentration on a support for objects of low occurrence having a high-contrast surface state, consisting of illuminating the observation zone with a first light source (5) emitting in a first wavelength range and with a second source (4) emitting in the excitation spectrum of the objects (23, 32) of low occurrence, proceeding to focusing the image acquisition means and after focusing triggering the accumulation of photons emitted by the objects (23, 32) of low occurrence illuminated with a source (4) emitting in the excitation spectrum of said objects (23, 32), characterized in that one proceeds to a modification of the focusing of the image acquisition means until maximization of the contrast of a zone (30) in said first wavelength range, said zone (30) being dissociable from the observation zone illuminated by the second light source.

2. The process of automatic analysis of elements in weak concentration on a support of objects (23, 32) of low occurrence of claim 1, characterized in that with the first light source (5), a marginal zone (30) of the observation field is illuminated, the second light source illuminating at least the complementary zone of the observation field.

3. The process of automatic analysis of elements in weak concentration on a support of objects (23, 32) of low occurrence of claim 2, characterized in that a marginal zone (30), advantageously between 3 and 8% of the surface area of the field of observation, is illuminated with the first light source (5) in the visible spectrum, and the focusing is determined as a function of the maximization of the difference between the value of the pixel of slightest luminosity and the value of the pixel of the greatest luminosity.

4. (Amended) The process of automatic analysis of elements in weak concentration on a Support of objects (23, 32) of low occurrence of claim, characterized in that the support of the object is illuminated alternatingly with the first light source (5) emitting in the visible spectrum and with the second light source (4), and focusing is done synchronously with the operation of the first light source (5) by modification of the focusing of the image acquisition means until the contrast in a zone (30) illuminated by the visible light is maximized.

5. (Amended) The process of automatic analysis of elements in weak concentration on a support of objects (23, 32) of low occurrence of claim 1, characterized in that the support is illuminated with a first light source (5) in the visible spectrum, emitting in a first wavelength range different from the second wavelength range of fluorescence of the objects observed, the image acquisition means including means for separating the two wavelength ranges, the process consisting of proceeding to modify the focusing of the image acquisition means until maximization of the contrast of the image corresponding to the first wavelength range.

6. An apparatus for microscopic analysis of elements in weak concentration on an object support having a high-contrast surface state, a stage (2) on which the support (22) carrying the objects (23, 32) to be analyzed is disposed, a first illumination element including a source of light (5) in the visible spectrum and collimating means constituted by a condenser (24) and a diaphragm (26), a second illumination element (4) and an image acquisition means (6) furnishing an electrical signal to a circuit for signal processing (7) and visualization (8) of the images observed, the analysis apparatus being characterized in that it includes means (29) for separating a first image corresponding to the illumination with the first light source (5) and a second image corresponding to the illumination with the second light source (4) emitting in the excitation spectrum of fluorescent markers, and that the signal processing circuit furnishes a slaving signal of the focusing as a function of the contrast of said first image in said zone illuminated by the first illumination means (5).

7. The microscopic analysis apparatus of claim 6, characterized in that it includes means (29) to cause the zone illuminated by the first illumination element (5) to coincide with a marginal zone (30) of the observation field, and that the signal processing circuit furnishes a slaving signal of the focusing as a function of the contrast of the image in said zone illuminated by the first illumination means.

8. The microscopic analysis apparatus of claim 6, characterized in that it includes means (29) for off-centering the optical axis (25) of the assembly for illumination by transmission relative to the main optical axis (12) of the optical block (3), in such a way as to form an illuminated zone (30) occupying a marginal portion of the observation field.

9. The apparatus for microscopic analysis of elements in weak concentration on an object support having a high-contrast surface state of claim 6, characterized in that it includes means for alternatingly activating the first light source (5) and the second light source (4), and that the processing circuit (7) furnishes a synchronizing signal for the activation of the focusing when the first light source (5) is active.

10. The apparatus for microscopic analysis of elements in weak concentration on an object support having a high-contrast surface state of claim 6, characterized in that it includes an image acquisition means that furnishes chromatic signals, the first light source (5) emitting in a wavelength range distinct from the fluorescence length of the objects observed, the processing circuit (7) generating a first signal corresponding to the image in the wavelength range of the first light source, said signal constituting the slaving signal of the focusing as a function of the contrast of first said image in said zone illuminating by the first illumination means (5), and a second signal corresponding to the image of the objects observed.

* * * * *